March 12, 1929.  B W. TWYMAN ET AL  1,705,165
COUNTERWEIGHT FOR SHAFTS AND METHOD FOR ATTACHING
Original Filed April 6, 1920
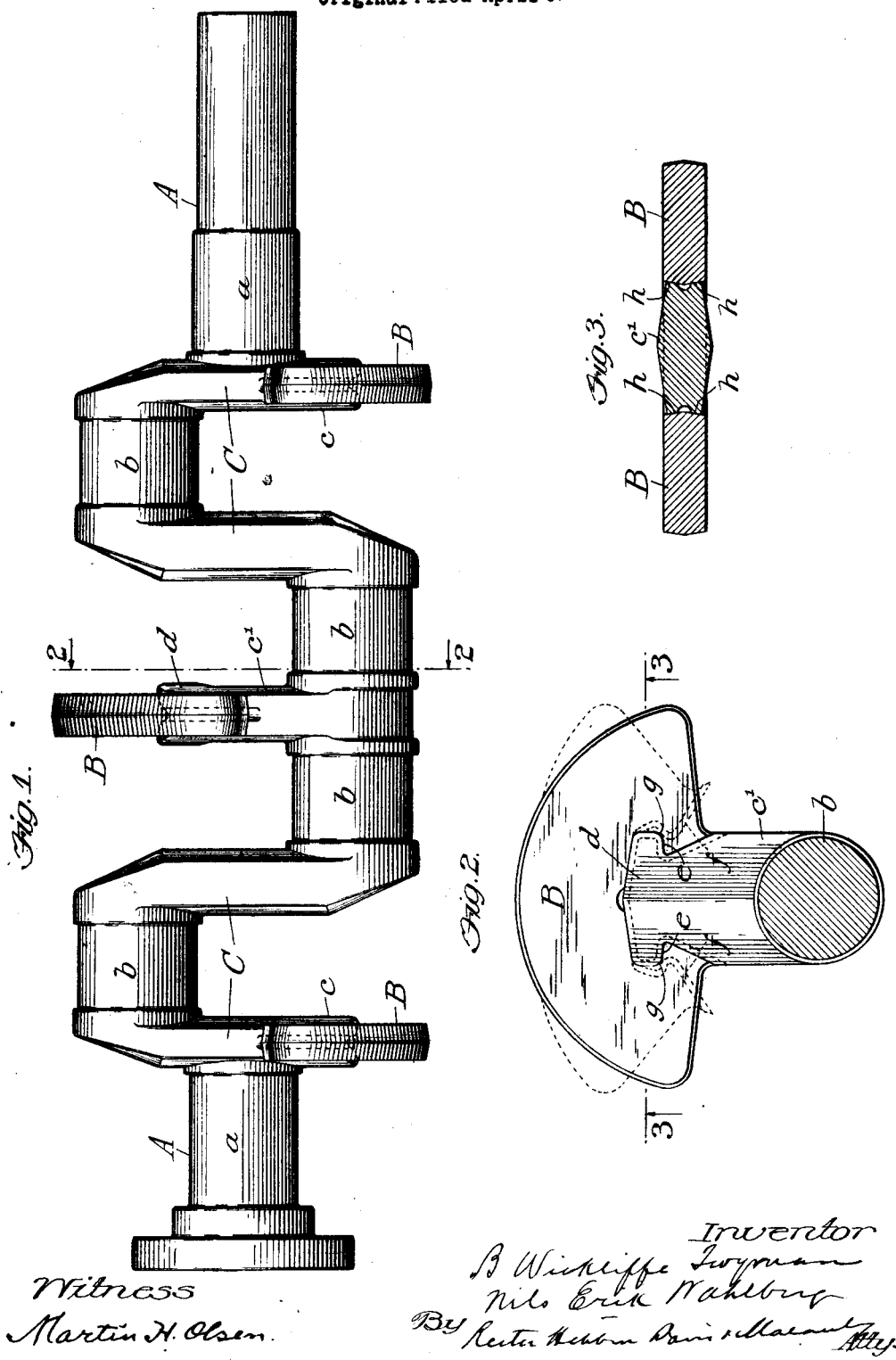

Patented Mar. 12, 1929.

1,705,165

UNITED STATES PATENT OFFICE.

B WICKLIFFE TWYMAN, OF INDIANAPOLIS, INDIANA, AND NILS ERIK WAHLBERG, OF KENOSHA, WISCONSIN.

COUNTERWEIGHT FOR SHAFTS AND METHOD FOR ATTACHING.

Application filed April 6, 1920, Serial No. 371,681. Renewed August 13, 1928.

Our invention is applicable to all revolving shafts employing counter-weights, but has been designed with special reference to use on the crank-shafts of internal combustion engines such as automobile engines and is particularly advantageous and useful in that connection. Several methods of providing such shafts with counter-weights have been heretofore employed, all of which were subject to certain objections which are overcome by our invention. One of the prior methods was to form the counter-weights integral with the shaft or with radial arms projecting from it, but this method was expensive in both material and labor. Another was to weld the counter-weights to the shaft or its radial arms, but this was expensive in labor and also somewhat insecure in the attachment of the counter-weights owing to the fact that the process of welding was subject to occasional variation. Another was to secure the counter-weights to the shaft or its arms by means of bolts, but this method was insecure and unsatisfactory. Our invention overcomes the objection to each of these methods and enables us to equip such a shaft with counter-weights at a materially less cost than that involved in the use of the two methods first mentioned and in a more secure and satisfactory manner than by the use of the method last mentioned, all as will be hereinafter more fully described.

In the accompanying drawing Fig. 1 is a side view of a conventional two-bearing crank-shaft for a four-cylinder engine equipped with our invention; Fig. 2 a vertical cross-section of the same on the line 2—2 of Fig. 1, looking in the direction of the arrows; and Fig. 3 a section on the line 3—3 of Fig. 2 looking in the direction of the arrows in that figure.

The same letters of reference are used to indicate corresponding parts in the several views.

Referring to Fig. 1, A represents the crank-shaft having the two bearings $a$, $a$ and the four cranks $b$, $b$, $b$, $b$. The two outermost or end counter-weights B, B are applied to extensions $c$ of the outer arms or throws of the cranks C, C, while the intermediate or middle counter-weight B is applied to a radial arm $c'$ projecting from the portion of the crank-shaft intermediate the two outer cranks and in a direction diametrically opposite to the two arms or extensions $c$, $c$ to which the outer counter-weights B, B are secured.

The counter-weights (preferably made of drop-forgings) are of the same general character and applied in the same way in all three instances, the only difference between them being that the middle one is somewhat larger and heavier in the present instance than the two outer ones. The shape of the counter-weights and the method of securing them to the shaft will be described by reference to the middle one of the three, which is shown in side elevation in Fig. 2 and in cross-section in Fig. 3.

The outer end of the radial arm to which the counter-weight is applied is shaped in any suitable manner to form an anchoring head $d$ provided with locking shoulders $e$, $e$, upon its side facing the shaft from which the arm projects. The counter-weight B, which is to be anchored to the arm by means of its anchoring head $d$, may be made of any suitable shape. In the present instance, and in our preferred form, it may be described as fan-shaped or aproximately semi-circular in outline when secured in place, as shown by the solid lines in Fig. 2, but before being secured in position it is, in this instance, of approximately the shape indicated by the dotted lines in Fig. 2. That is to say, it is provided upon its side or edge facing the shaft with a flaring mouth forming opposing clamping jaws $f$, $f$, provided with locking shoulders $g$, $g$, to engage the shoulders $e$, $e$ of the anchoring head $d$.

The size and shape of the mouth of the counter-weight are preferably such that it can be applied edgewise to the anchoring head, $d$, but it may be made of such size and shape as to require it to be applied sidewise. When applied in either manner it may be permanently secured in place upon the anchoring head by being squeezed into secure engagement therewith in suitable dies, and be held from lateral displacement by peening or welding the contacting surfaces of the counter-weight and anchoring head along their outer edges. In our preferred practice, however, and the one we have found to be the most efficient, the counter-weight is heated to a red heat before application, and after being applied and squeezed into secure engagement with the anchoring head it is allowed to shrink into more intimate and secure contact therewith than if applied without heating.

In our preferred practice, also, the means employed for preventing accidental displacement of the counter-weight sidewise of the radial arm and anchoring head to which it is secured consists in so forming the contacting surfaces of the counter-weight and anchoring head that their engagement with each other will of itself prevent lateral displacement of the counter-weight. This is the provision indicated in the drawing and particularly shown in Fig. 3, where it will be seen that the outer edge of the anchoring head *d* and the adjacent surfaces of the radial arm are shaped to form a locking seat for the counter-weight, as at *h, h*, and that the edges of the mouth or jaws of the counter-weight are correspondingly shaped for engagement therewith. In this manner and by these means when the counter-weight is squeezed and shrunk into engagement with the anchoring head, in the manner described, it will be securely held not only against radial disengagement from the head, due to centrifugal force, but from lateral displacement due to any other cause. The outer edges of the abutting surfaces of the counter-weight and anchoring head may be welded or peened in this instance also, but this is not essential inasmuch as the engagement of the interlocking surfaces themselves will suffice to securely hold the parts in place. The semi-circular lines at the middle of the meeting surfaces of the anchoring head and counter-weight in Fig. 3 indicate a clearance groove formed in the edge of the head to freely accommodate the apex of the contacting face of the counter-weight, and the similar line in Fig. 2 indicates a similar clearance space formed in the counter-weight to accommodate the apex of the edge of the anchoring head.

Our invention has proved very satisfactory in commercial practice, reducing materially the expense of manufacture as compared with the first two methods mentioned in the early part of this specification, and affording a more secure attachment of the counter-weight in practical use than the third method.

It will be noted that the radial arms which carry the counter-weights are of such length as to extend into the counter-weights to approximately their centers of gravity which adds materially to the security of the attachment of the counter-weights, as compared with constructions where the point of attachment of the counter-weights is nearer the shaft and more remote from the center of gravity of the counter-weights, by reducing the leverage that may be exerted by the counter-weight upon its point of attachment under strains in certain directions.

It will also be noted that there is a substantial body of metal in the counter-weight on either side of the anchoring head on the ends of the radial arms, the presence of which body of metal in the lines of stress materially strengthens the counter-weight and increases the security of its attachment to the shaft.

We are aware that it has been proposed to attach counter-weights to shafts by providing the latter with anchoring heads and forming recesses in the counter-weights to engage and interlock with said heads, and then welding the contacting surfaces together, but such method of attaching the counter-weights is more expensive than ours, due not only to the welding operation but also to the fact that in order to permit the latter operation the contacting surfaces which are to be welded together have to be machined, whereas in our construction no machining of the contacting surfaces of the anchoring head and counter-weight is required. Moreover, in none of such proposed methods or constructions with which we are familiar was the attachment of the counter-weight so secure or satisfactory as that attained by our method of applying the counter-weights to the anchoring heads in heated condition and allowing them to shrink upon the anchoring heads in interlocking engagement therewith.

Having thus fully described our invention, we claim:

1. The combination, with a shaft provided with an anchoring head, of a counter-weight anchored to said head and shrunk thereon, the engaging surfaces of the head and counter-weight being such as to prevent lateral displacement of the counter-weight.

2. The combination, with a shaft provided with an anchoring head having opposite locking shoulders on its side adjacent the shaft, of a counter-weight having a flaring mouth provided with cooperating locking shoulders to engage the shoulders on the anchoring head and squeezed into engagement therewith and shrunk thereon.

3. The combination, with a shaft provided with an anchoring head having opposite locking shoulders on its side adjacent the shaft, of a counter-weight having a flaring mouth provided with cooperating shoulders adapted to engage the shoulders on the anchoring head and squeezed into engagement therewith and shrunk thereon, the engaging surfaces of the head and counter-weight being suitably shaped to prevent lateral displacement of the counter-weight.

4. The combination, with a shaft provided with an anchoring head, of a counter-weight anchored to said head, the head projecting into the counter-weight to approximately its center of gravity.

5. The combination, with a shaft provided with an anchoring head, of a counter-weight anchored to said head and shrunk thereon, the head projecting into the counter-weight to approximately its center of gravity.

6. The combination, with a shaft provided with an anchoring head, of a counter-weight anchored to said head and shrunk thereon, and having a substantial body of metal on each side of the head to resist strains.

7. The combination, with a shaft provided with an anchoring head, of a counter-weight anchored to said head and shrunk thereon, said head projecting into the counter-weight to approximately its center of gravity, and the counter-weight having a substantial body of metal on each side of the head to resist strains.

8. The combination, with a shaft provided with an integral radially extending arm terminating in an anchoring head having opposite locking shoulders on its side adjacent the shaft, of a counter-weight having a flaring mouth provided with cooperating locking shoulders to engage the shoulders on the anchoring head and squeezed into engagement therewith, the length of the radial arm and the character of the recess in the counter-weight being such as to cause the end of the arm to extend into the counter-weight to approximately its center of gravity.

9. The combination, with a shaft provided with an integral radially extending arm terminating in an anchoring head having opposite locking shoulders on its side adjacent the shaft, of a counter-weight having a flaring mouth provided with cooperating locking shoulders to engage the shoulders on the anchoring head and squeezed into engagement therewith and shrunk thereon, the length of the radial arm and the character of the recess in the counter-weight being such as to cause the end of the arm to extend into the counter-weight to approximately its center of gravity.

10. The herein described method of attaching counter-weights to shafts, consisting in providing the shaft with an anchoring head having opposite locking shoulders on its side adjacent the shaft, providing the counter-weight with a recess having cooperating locking shoulders to engage the shoulders on the anchoring head, heating the counter-weight and applying it to the anchoring head and squeezing it into interlocking engagement therewith and permitting it to shrink thereon.

11. The combination, with a shaft having a radial arm formed at its extremity into an anchoring head $d$, having the opposite locking shoulders $e$, $e$, on its side adjacent the shaft, in combination with the counter-weight B having the flaring mouth forming the opposing jaws $f$, $f$, and locking shoulders $g$, $g$ for cooperation with the shoulders $e$, $e$ of the anchoring head $d$, the counter-weight B being squeezed into engagement with the anchoring head and shrunk thereon.

12. In a counterbalanced crank shaft, the combination of a crank shaft having a flaring lug projecting laterally therefrom, and a counterweight shrunk on said lug.

B WICKLIFFE TWYMAN.
NILS ERIK WAHLBERG.